(12) United States Patent
Rojas et al.

(10) Patent No.: US 10,121,237 B1
(45) Date of Patent: Nov. 6, 2018

(54) COMPONENT INSPECTION METHOD (71) Applicant: Rohr, Inc., Chula Vista, CA (US)

(72) Inventors: Jonathan D. Rojas, La Mesa, CA (US); Larry W. Brannock, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 22 days.

(21) Appl. No.: 15/489,238

(22) Filed: Apr. 17, 2017

(51) Int. Cl.
*G06T 7/00* (2017.01)
*G06T 7/73* (2017.01)

(52) U.S. Cl.
CPC ............ *G06T 7/0006* (2013.01); *G06T 7/001* (2013.01); *G06T 7/74* (2017.01); *G06T 2207/10152* (2013.01); *G06T 2207/30164* (2013.01); *G06T 2207/30204* (2013.01)

(58) Field of Classification Search
CPC .......... G06T 7/0006; G06T 7/74; G06T 7/001
See application file for complete search history.

(56) References Cited

U.S. PATENT DOCUMENTS

| | | | |
|---|---|---|---|
| 5,424,634 A | 6/1995 | Goldfarb et al. | |
| 6,271,924 B1 | 8/2001 | Ngoi et al. | |
| 7,149,677 B2 | 12/2006 | Jayaram et al. | |
| 7,162,319 B2 | 1/2007 | Popp et al. | |
| 7,206,080 B2 | 4/2007 | Kochi et al. | |
| 7,327,857 B2 | 2/2008 | Lloyd, Jr. et al. | |
| 7,372,558 B2 | 5/2008 | Kaufman et al. | |
| 7,463,368 B2 | 12/2008 | Morden et al. | |
| 7,474,407 B2 | 1/2009 | Gutin | |
| 7,573,586 B1 | 8/2009 | Boyer et al. | |
| 7,612,893 B2 | 11/2009 | Kuchel | |
| 7,869,026 B2 | 1/2011 | Boyer et al. | |
| 8,688,408 B2 | 4/2014 | Marsh et al. | |
| 8,942,837 B2 | 1/2015 | Romanelli et al. | |

(Continued)

FOREIGN PATENT DOCUMENTS

| | | |
|---|---|---|
| JP | 2003-093190 | 12/2003 |
| JP | 2004-093190 | 3/2004 |

(Continued)

OTHER PUBLICATIONS

Klaas et al. "Robotic Scanning Using a White Light Scanner", Quality Digest, Aug. 24, 2009.

*Primary Examiner* — David F Dunphy
(74) *Attorney, Agent, or Firm* — O'Shea Getz P.C.

(57) ABSTRACT

An inspection method includes: receiving image data from a non-contact inspection system, the image data indicative of a plurality of captured images of light projected onto a component system comprising a component; processing the image data using a processing system to provide model data that models at least a portion of a surface of the component; comparing the model data to nominal data for a design model for the component using the processing system to determine a subset of the model data that is closest to the nominal data; identifying model data points in the subset of the model data based on identities of correlated nominal data points in the nominal data using the processing system to provide measurement data; and comparing the measurement data to design data for the design model for the component using the processing system to determine deviation between the measurement data and the design data.

19 Claims, 5 Drawing Sheets

(56) References Cited

U.S. PATENT DOCUMENTS

| | | | |
|---|---|---|---|
| 2003/0130758 A1 | 7/2003 | Hirano et al. | |
| 2004/0120568 A1* | 6/2004 | Kidd | G01B 21/16 |
| | | | 382/141 |
| 2005/0066739 A1 | 3/2005 | Gotkis et al. | |
| 2008/0015827 A1 | 1/2008 | Tryon et al. | |
| 2008/0123112 A1* | 5/2008 | Marsh | G01C 11/02 |
| | | | 356/625 |
| 2009/0033947 A1 | 2/2009 | Boyer et al. | |
| 2009/0089020 A1 | 4/2009 | Boyer et al. | |
| 2009/0141984 A1* | 6/2009 | Nakamura | G06K 9/6211 |
| | | | 382/201 |
| 2009/0254286 A1 | 10/2009 | Tulyani et al. | |
| 2010/0194749 A1* | 8/2010 | Nightingale | G01N 23/046 |
| | | | 345/424 |
| 2010/0296725 A1 | 11/2010 | Seiffert | |
| 2015/0138349 A1 | 5/2015 | Hebert et al. | |
| 2015/0146964 A1* | 5/2015 | Tai | G06T 19/20 |
| | | | 382/141 |
| 2016/0335523 A1* | 11/2016 | Piotto | G06F 17/30247 |
| 2017/0148102 A1* | 5/2017 | Franke | G06Q 10/20 |
| 2017/0352192 A1* | 12/2017 | Petrovskaya | G06T 7/77 |
| 2018/0128598 A9* | 5/2018 | Stewart | G01B 11/105 |

FOREIGN PATENT DOCUMENTS

| | | |
|---|---|---|
| JP | 2007-333462 | 12/2007 |
| JP | 2009-264956 | 11/2009 |
| KR | 10-2009-0039942 | 4/2009 |

* cited by examiner

COMPONENT INSPECTION METHOD

BACKGROUND

1. Technical Field

This disclosure relates generally to inspection methods and, more particularly, to inspection of one or more components using, for example, a non-contact inspection system.

2. Background Information

Various inspection methods are known in the art. In some inspection methods, a white light non-contact inspection system is utilized to obtain data points related to a surface of an object. These data points are then processed and reviewed to determine whether the surface of the object is within tolerance of a design for that object. However, during such an inspection method, marker tapes are typically applied onto the surface of the object. Typically, such marker tapes need to be placed in precise locations on the object such that data associated with those marker tapes obtained during the inspection can be compared to nominal data. Such a process may be time consuming and require operators applying the tape to have specialized training. The cost of the marker tape can also be relatively expensive. There is a need in the art therefore for inspection methods that include additional autonomization to reduce inspection time, expense and training required for operators.

SUMMARY OF THE DISCLOSURE

According to an aspect of the present disclosure, an inspection method is provided that includes receiving image data from a non-contact inspection system, where the image data is indicative of a plurality of captured images of light projected onto a component system comprising a component. The image data is processed using a processing system to provide model data that models at least a portion of a surface of the component. The model data is compared to nominal data for a design model for the component using the processing system to determine a subset of the model data that is closest to the nominal data. Model data points are identified in the subset of the model data based on identities of correlated nominal data points in the nominal data using the processing system to provide measurement data. The measurement data is compared to design data for the design model for the component using the processing system to determine deviation between the measurement data and the design data.

According to another aspect of the present disclosure, another inspection method is provided that includes projecting a pattern of light onto a component system comprising a component of an aircraft using at least one projector. Images of the pattern of light projected onto the component system are captured using one or more cameras. Image data is processed using a processing system to provide model data that models at least a portion of a surface of the component, the image data indicative of the captured images. A subset of the model data is determined that is closest to nominal data for a design model for the component using the processing system. Information corresponding to nominal data points in the nominal data is correlated with model data points in the subset of the model data using the processing system to provide measurement data. Deviation is determined between the measurement data and design data for the design model for the component using the processing system.

The inspection method may further include: projecting the light onto the component system using a projector, and capturing images of the light projected onto the component system using one or more cameras to provide the image data. The non-contact inspection system comprises the projector and the one or more cameras.

The component system may include a jig supporting the component. The image data may include jig image data associate with the jig. The processing of the image data may include processing the jig image data to spatially orient the model data relative to a known coordinate system.

The inspection method may further include disposing a plurality of locators on the component system. The image data may include locator image data associate with the locators. The processing of the image data may include processing the locator image data to provide spatial coordinates to data points of the model data.

The nominal data points may be indicative of points along loft lines of the design model for the component.

Design data points in the design data may correspond to the points along the loft lines of the design model for the component.

The identifying the model data points in the subset of the model data may include naming the model data points in the subset of the model data based on names of the correlated nominal data points in the nominal data.

The inspection method may further include processing the deviation between the measurement data and the design data to determine whether or not the component is in or out of tolerance of a design for the component.

The inspection method may further include: receiving second image data from the non-contact inspection system, the second image data indicative of a plurality of second captured images of light projected onto a second component system comprising a second component; processing the second image data to provide second model data that models at least a portion of a surface of the second component; comparing the second model data to the nominal data to determine a subset of the second model data that is closest to the nominal data; identifying model data points in the subset of the second model data based on identities of correlated nominal data points in the nominal data to provide second measurement data; comparing the second measurement data to the design data to determine deviation between the second measurement data and the design data; and comparing the deviation between the measurement data and the design data and the deviation between the second measurement data and the design data.

The component may be configured as or otherwise include a component of an aircraft.

The component may be configured as or otherwise include a component of a nacelle for an aircraft propulsion system.

The non-contact inspection system may be a white light non-contact inspection system.

The inspection method may further include processing the deviation between the measurement data and the design data to determine whether the component is at least one of within or outside tolerance of a design for the component.

The component system may include a jig supporting the component. The image data may include jig image data associate with the jig. The jig image data may be used to spatially orient the model data relative to a known coordinate system.

The nominal data points may be indicative of points along loft lines of the design model for the component.

Design data points in the design data may correspond to the points along the loft lines of the design model for the component.

The component may be configured as or otherwise include an inlet structure of a nacelle. The projecting the pattern of light may include projecting a pattern of light onto an inner radial exterior surface of the inlet structure and onto an outer radial exterior surface of the inlet structure.

The projecting the pattern of light may include projecting a pattern of light onto the component system at a plurality of locations about the component. The capturing the images may include capturing images of the pattern of light projected onto the component system at each of the locations about the component.

The foregoing features and the operation of the invention will become more apparent in light of the following description and the accompanying drawings.

DETAILED DESCRIPTION

The present disclosure includes methods and systems for inspecting one or more components. An exemplary component for such inspection is a component of an aircraft; e.g., a commercial airliner. The component, for example, may be configured as or included in an aircraft propulsion system, an aircraft fuselage, an aircraft wing, an aircraft stabilizer or an aircraft pylon. Where the component is included in an aircraft propulsion system, the component may be configured as a part of a nacelle such as, but not limited to, an inlet structure (e.g., an inlet lip, a forward portion of a fanlet, etc.) of the nacelle. The present disclosure, however, is not limited to the foregoing exemplary aircraft components. Furthermore, the present disclosure is not limited to aircraft component inspection. However, for ease of description, the component is described below as an inlet structure.

In the case of an inlet structure or other aircraft components, the inspection methods of the present disclosure may be useful for determining whether or not an aerodynamic surface of the component is within design tolerance as described below in further detail. This may be particularly useful where the aerodynamic surface is designed for passive laminar flow control and/or other applications where tight tolerances may be critical to facilitate proper component functionality.

Figure 1:
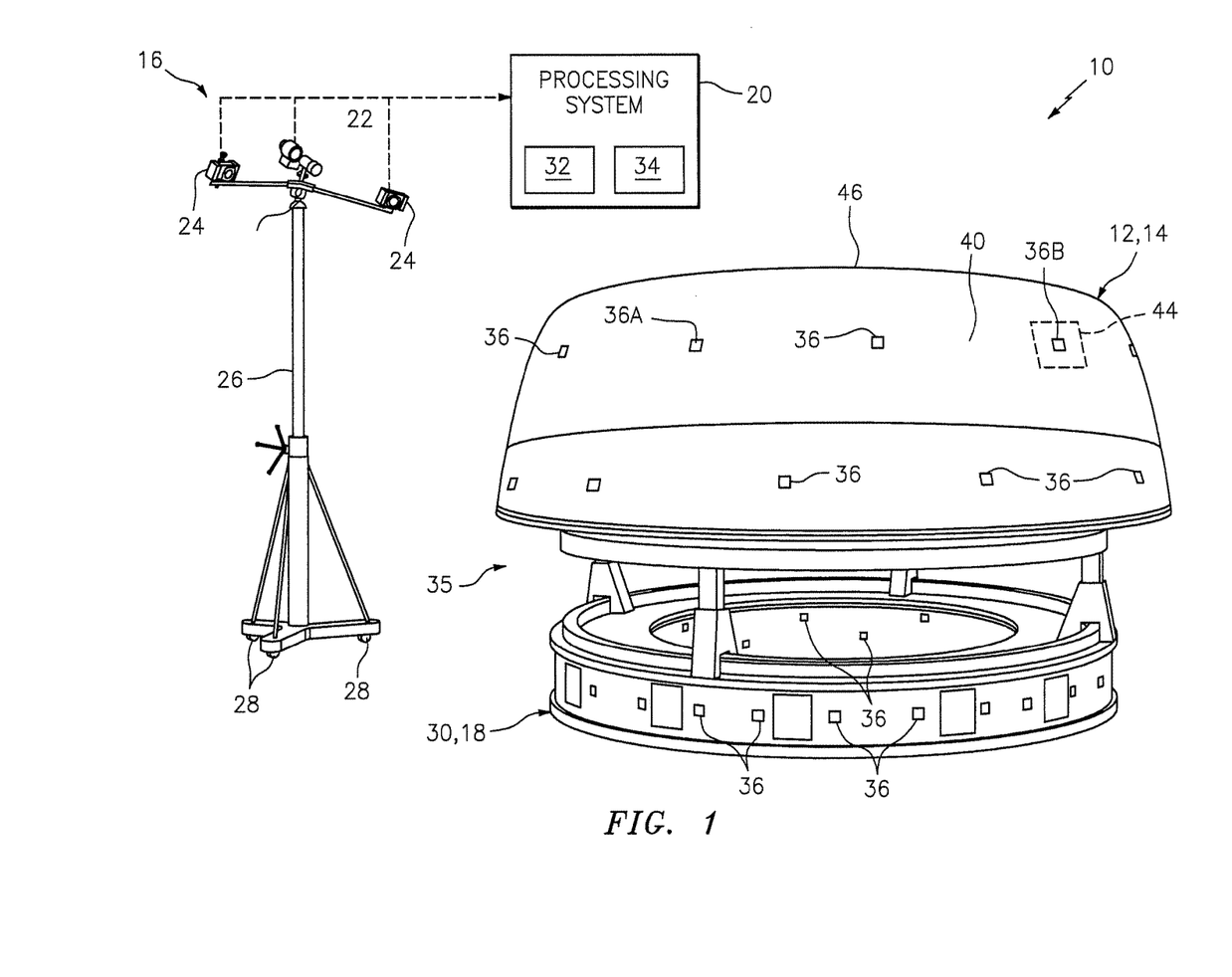
FIG. 1 is a perspective and schematic illustration of a system for inspecting a component such as a nacelle inlet structure.

FIG. 1 illustrates an exemplary system 10 for inspecting at least one component 12 such as an inlet structure 14 of a nacelle. This system 10 includes an inspection system 16, a component support 18 and a processing system 20.

The inspection system 16 may be configured as a non-contact inspection system such as, but not limited to, a white light non-contact inspection system. The inspection system 16 of FIG. 1, for example, includes a (e.g., white light) projector 22 and one or more optical cameras 24. The projector 22 is adapted to project a point, a line and/or a pattern of light (e.g., a pattern of white light points (e.g., dots)). Each of the cameras 24 is adapted to capture an image of the light projected from the projector 22. The present disclosure, however, is not limited to such an exemplary non-contact inspection system. For example, in other embodiments, the inspection system 16 may include a laser scanning device, a blue light optical scanner, a computed axial tomography scanning (CAT scan) device or any other suitable non-contact scanning device. In still other embodiments, the inspection system 16 may be configured as or otherwise include a contact inspection system.

The inspection system 16 may be mounted on an inspection system support structure 26; e.g., a support stand. This support structure 26 may include wheels 28 (e.g., casters) at its bottom end to enable easy movement/positioning of the inspection system 16 around the component 12 and the component support 18. Of course, in other embodiments, the support structure 26 may be connected to a track system and/or a robotic manipulator system to enable automated movement of the inspections system about the component 12 and the component support 18. Referring again to FIG. 1, the support structure 26 may also be configured to enable vertical adjustment of the inspection system 16 such that, for example, the projector 22 and/or one or more of the cameras 24 may be vertically repositioned up or down.

The component support 18 of FIG. 1 is configured as a support jig 30. This support jig 30 is configured to support the component 12 thereon, or otherwise therewith. The support jig 30 may also be configured, for example, to precisely locate the component 12 therewith. In this manner, for example, a bottom of the component 12 may be at a known/predetermined height. In another example, a centerline of the component 12 may be coaxial with a centerline of the support jig 30. This may enable the component support 18 to be used as a spatial reference for data collected about the component 12 by the inspection system 16.

The processing system 20 is in signal communication with the inspection system 16 and, more particularly, the projector 22 and one or more of the cameras 24. The processing system 20 may be implemented with a combination of hardware and software. The hardware may include memory 32 and at least one processing device 34, which may include one or more single-core and/or multi-core processors. The hardware may also or alternatively include analog and/or digital circuitry other than that described above.

The memory 32 is configured to store software (e.g., program instructions) for execution by the processing device 34, which software execution may control and/or facilitate performance of one or more operations such as those described in the inspection methods below. The memory 32 may be a non-transitory computer readable medium. For example, the memory 32 may be configured as or include a volatile memory and/or a nonvolatile memory.

Figure 2:
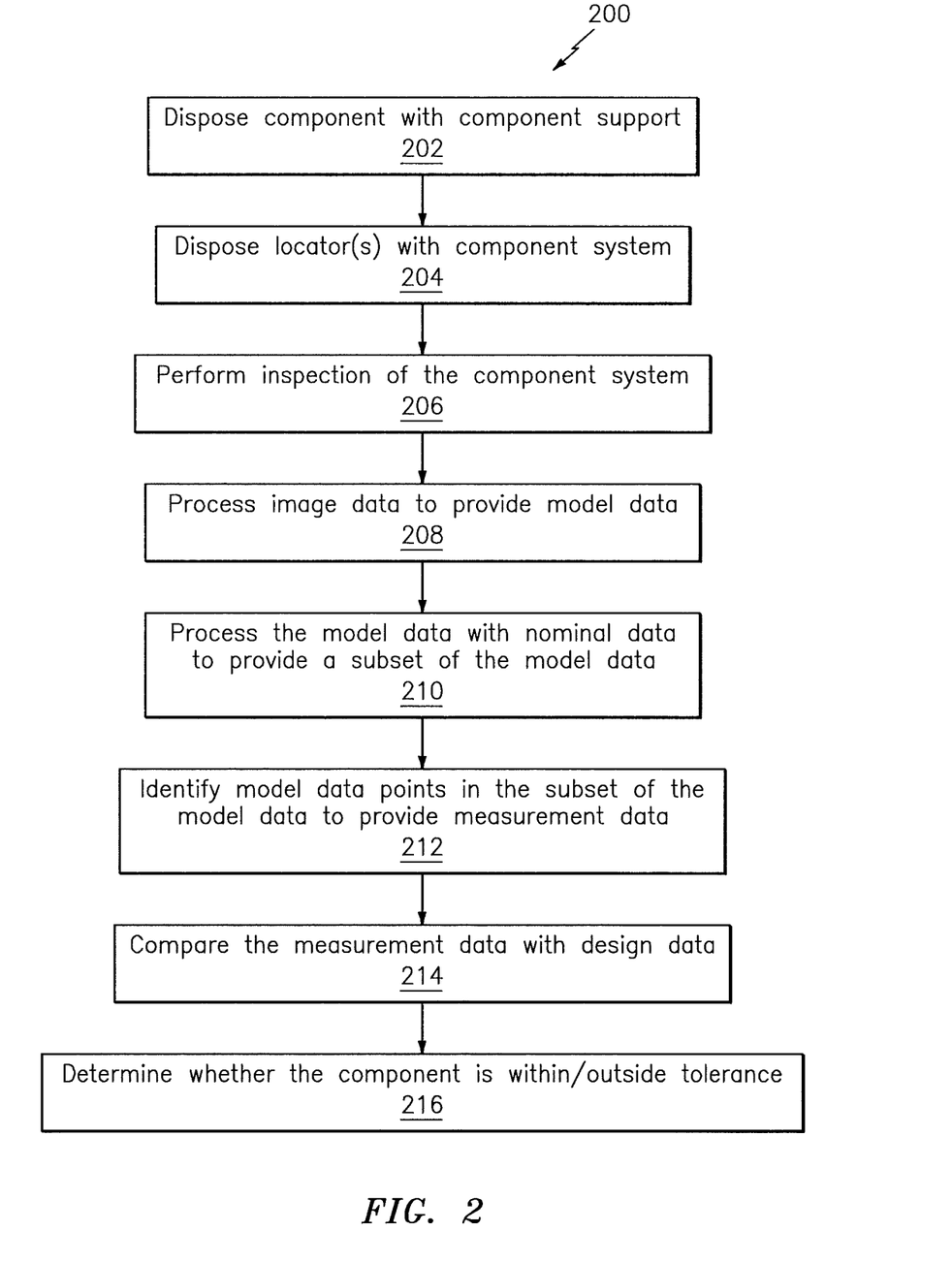
FIG. 2 is a flow diagram of a method for inspecting a component.

FIG. 2 is a flow diagram of a method 200 for inspecting the component 12. This component 12 is described below as the inlet structure 14 of a nacelle for an aircraft propulsion system for ease of description. However, this method of the present disclosure is not limited to such an exemplary component configuration or aircraft component inspection.

In step 202, the inlet structure 14 is disposed with the support jig 30 as shown, for example, in FIG. 1. In this manner, the inlet structure 14 may be located at (or about)

a known/predetermined height off of the ground. The inlet structure 14 may also be precisely located relative to the support jig 30, such that known/predetermined information regarding the support jig 30 can be later used to provide a spatial reference for data collected about the inlet structure 14 by the inspection system 16. Once the inlet structure 14 is disposed (e.g., mounted) with the support jig 30, these elements 14 and 30 provide a component system 35. Of course, in other embodiments, the component system 35 may just include the inlet structure 14 where, for example, the inlet structure 14 is disposed on the ground without a component support.

Figure 3A:
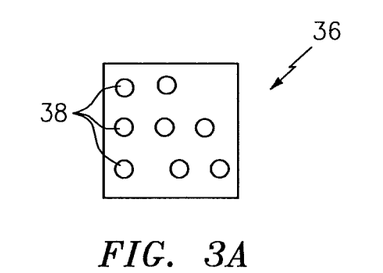
FIGS. 3A-3C are illustrations of various locators.
Figure 3B:
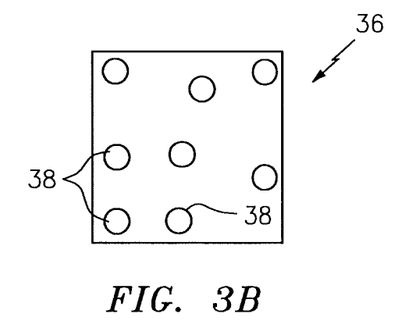
Figure 3C:
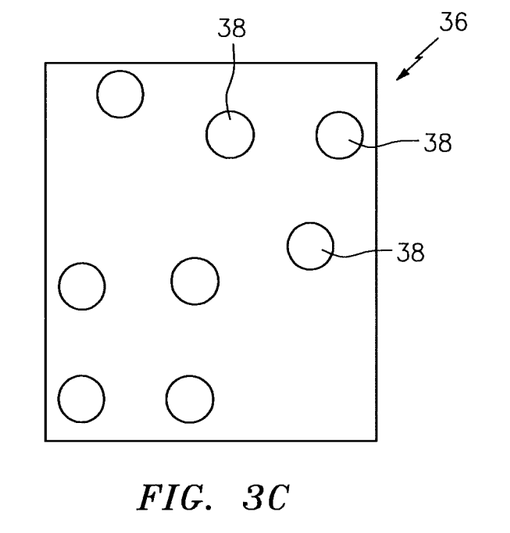

In step 204, one or more locators 36 are disposed with the component system 35. Exemplary embodiments of such locators 36 are illustrated in FIGS. 3A-C. Each of these locators 36 is configured with one or more features 38; e.g., visual graphic dots. Each of the locators 36 is also associated with one or more known/predetermined parameters such as, but not limited to, a number of the features 38, a size of the features 38, a spatial arrangement of the features 38, etc. The present disclosure, however, is not limited to the foregoing exemplary locator embodiments.

Figure 4:
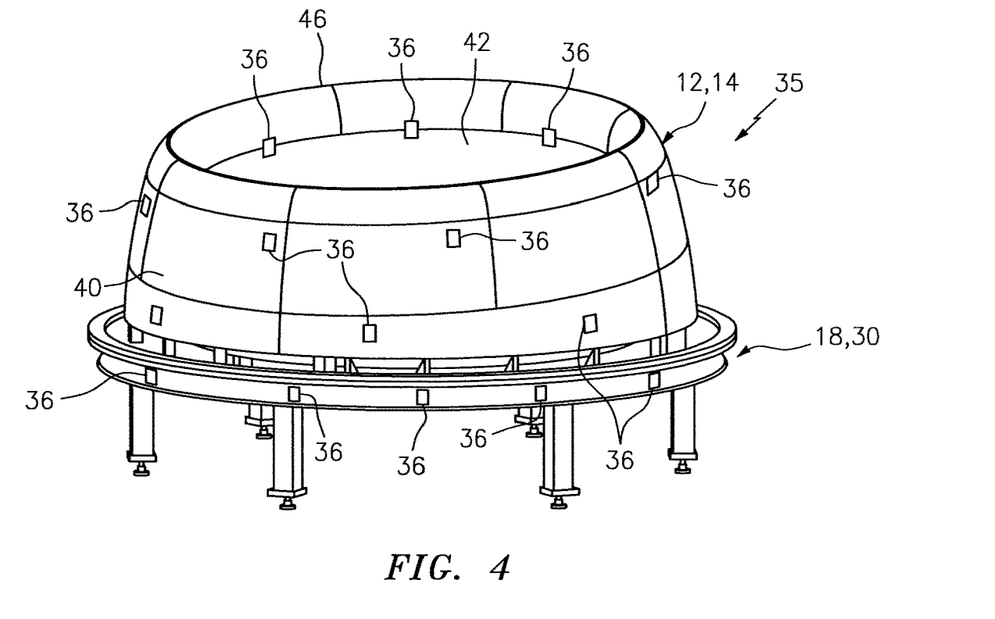
FIG. 4 is a perspective illustration of a component system.

One or more of the locators 36 are placed (e.g., by hand) on a radial outer exterior surface 40 of the inlet structure 14. One or more of the locators 36 are placed on a radial inner exterior surface 42 (see FIG. 4). One or more of the locators 36 are also placed on one or more surfaces of the component support 18; however, in other embodiments, these component support locator(s) may be preplaced before implementation of this method 200.

The locators 36 may be placed at specific locations with the component system 35. Alternatively, one or more of the locators 36 may be placed at any location and/or orientation within general regions. For example, since the locators 36 may be placed by hand, the method 200 may accommodate tilting of the locators 36 (e.g., see tilted locator 36A). The method 200 may also accommodate positioning, for example, each locator 36 (e.g., see 36B) anywhere within a respective quadrant 44, which quadrant 44 may be more than 1.5-10× larger than the respective locator 36. In this manner, personnel with less training/expertise in photogrammetry may facilitate performance of the method 200.

In step 206, an inspection of the component system 35 is performed. During this inspection, light is projected onto the component system 35. For example, a pattern of white light dots is projected onto a portion of the surfaces (see FIG. 1). The cameras 24 are then used to capture images of the light being projected onto the surfaces and provide the processing system 20 with image data associated with those captured images. The inspection system 16 may then be repositioned to another location about the component system 35, and the foregoing process of projecting light and capturing images may be repeated for that location. Such a repositioning and image capturing process may be performed as many times as necessary in order to, for example, to provide a substantially complete image (when the image data is compiled together) of all of or certain select portion(s) of the component surface 40. Of course, the foregoing may also or alternatively be performed to provide a substantially complete image (when the image data is compiled together) of all of or certain select portion(s) of the component surface 42 and/or a hilite 46 of the inlet structure 14 where needed.

In step 208, the processing system 20 processes the image data to provide model data. For example, after receiving the various image data from the inspection system 16, the processing system 20 may compile that data together to provide compiled image data. That compiled image data may include component image data, jig image data, and locator image data. The component image data is associated with the component 12. The jig image data is associated with the support jig 30. The locator image data is associated with the one or more of the locators 36.

Figure 5:
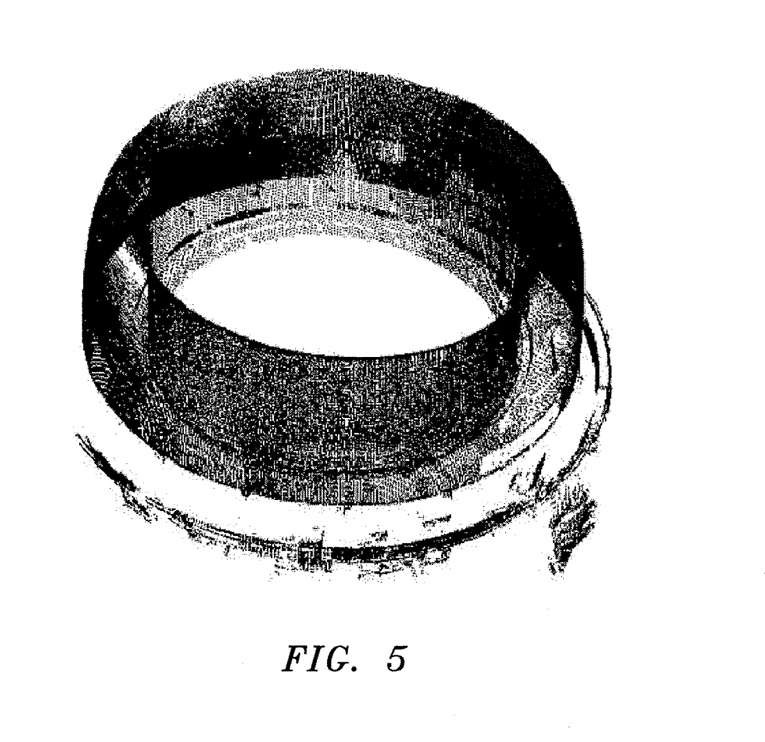
FIG. 5 is a graphical illustration of image data points obtained during a component inspection.

The jig image data may be processed using known methodologies to provide the compiled image data with a known coordinate system; e.g., a Cartesian or polar coordinate system. The locator image data may be processed using known methodologies to provide data points derived from the image data with coordinates; e.g., x-y-z coordinates for a Cartesian coordinate system. With this information, compiled image data may be further processed to computationally model (e.g., model in a computer aided design (CAD) environment) at least a portion of the component 12. This model may be formed by a mesh of model data points, which represent various positions on the surface(s) 40, 42 of the component system 35 as shown in FIG. 5. The model data includes (or otherwise represents) at least some or all of these model data points. In one non-limiting embodiment, the model data may be obtained using, as a software platform, V-STARS software provided by Geodetic Systems of Melbourne, Fla.

Figure 6:
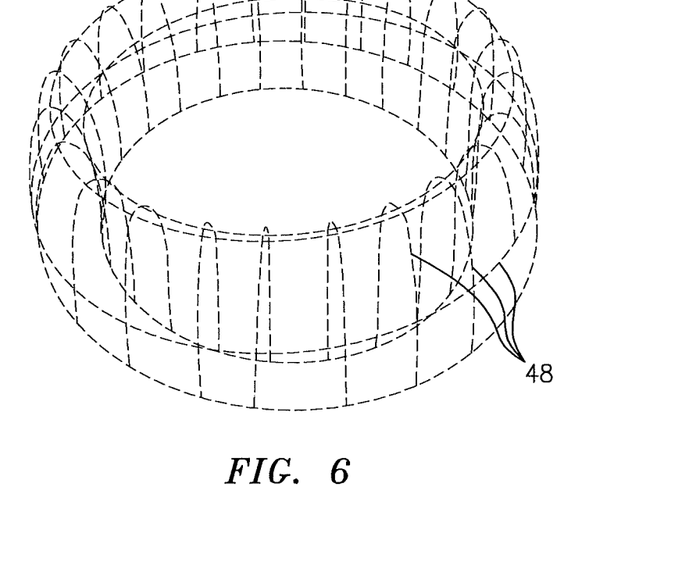
FIG. 6 is a graphical illustration of nominal data points.

In step 210, the processing system 20 processes the model data with nominal data. This nominal data is known/predetermined data, which is representative of a design model for the component 12—in this example, the inlet structure 14. Such a design model may be a model that could be used as or may be derived from a design plan for the formation of the inlet structure 14. The nominal data includes nominal data points. At least some of these data points may represent points taken along one or more loft lines 48 of the design model as shown, for example, in FIG. 6. The nominal data may be obtained using CATIA software by Dassault Systemes of Villacoublay Cedex, France, which data may then be imported into the V-STARS software.

Figure 7:
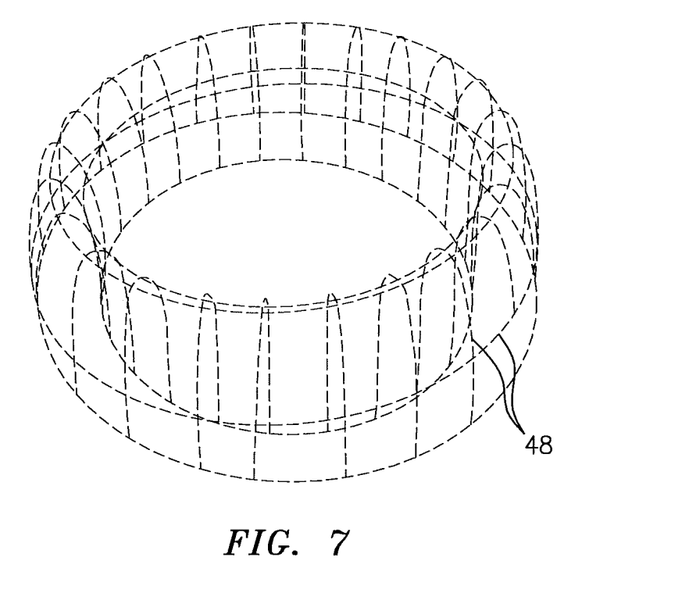
FIG. 7 is a graphical illustration of a subset of the image data points that closely match the nominal data points.

During the processing, the model data is compared to the nominal data. More particular, the model data points (see FIG. 5) included in the model data are compared to the nominal data points (see FIG. 6) included in the nominal data to determine which subset of the model data points are closest to the nominal data points (see FIG. 7). Once this subset of the model data points and, thus, subset of the model data is determined, the remaining portion of the model data and its data points may be discarded, or used for other purposes. This selection/reduction of data points is illustrated when comparing the model data points shown in FIG. 5 to the subset of the model data points shown in FIG. 7. This comparison and selection may be performed using the V-STARS software.

In step 212, the processing system 20 identifies the model data points in the subset of the model data based on identities of the correlated (e.g., similarly situated) nominal data points of the nominal data. For example, each nominal data point may have a name, which identifies its relative position in the design model. The processing system 20 may automatically assign this name to the closest determined model data point. The named subset of the model data points is now termed as measurement data. This naming may be performed using the V-STARS software.

The foregoing identification step 212 is automated such that the processing system 20 automatically correlates the model data points with the nominal data points in order to name the model data points. This may significantly reduce inspection time and operator expertise as compared to an inspection process where the model data point require manual identification during inspection setup.

In step 214, the processing system 20 processes the measurement data with design data. This design data is known/predetermined data, which is representative of the design model for the component 12—in this example, the inlet structure 14. The design data includes design data points similar to or the same as the nominal data points shown in FIG. 6. Again, at least some of these data points may represent points taken along one or more loft lines 48 of the design model. This processing may be performed using the V-STARS software.

During the processing, the measurement data is compared to the design data. More particularly, the named subset of the model data points are compared to the design data points to determine the deviation between those points. This deviation may be determined in terms of straight line distance or a vector. This comparison may be performed using BuildIT software by BuildIT Software and Solutions Ltd. of Montreal, Canada.

In step 216, the processing system 20 determines whether the inlet structure 14 is within or outside of tolerance. For example, the deviation associated with one or more of the named subset of the model data points may be compared to a respective limit (e.g., maximum allowed deviation). Where the deviation is within or equal to the bounds of the respective limit, that data point may be considered to be in compliance with (within tolerance of) the design model. However, where the deviation is outside of the bounds of (e.g., greater than) the respective limit, that data point may be considered to be non-compliant with (outside tolerance of) the design model. This processing may be performed using the BuildIT software.

An assessment of component tolerance may be provided (e.g., output) by the processing system 20 on a data point-by-data point basis (e.g., for each of the named subset of the model data points). Alternatively, the assessment of component tolerance may be provided by the processing system 20 for the measurement data as a whole or of subset(s) of the measurement data. For example, where one or more than a select number of the named subset of the model data points are outside of tolerance, the entire component 12 may be considered to be outside of tolerance. In addition or alternatively, where one or more of the named subset of the model data points are too far out of tolerance, the entire component 12 may be considered to be outside of tolerance. Various other schemes may also or alternatively be implemented to assess whether the component 12 is in or out of tolerance, and to what degree the component 12 is in or out of tolerance. The foregoing assessments may be performed using a series of VBA programs in Excel software by Microsoft Corporation of Redmond, Wash.

In some embodiments, the deviation data provided from the inspection of one component 12 may be compared to the deviation data provided from the inspection of one or more other similar components. This comparison may be made to determine whether the components being inspected are trending more-and-more out of tolerance (where applicable), other whether a component being out of tolerance is a one off event. This may help the component manufacture to assess the manufacture of the components. The foregoing processing may be performed using the series of VBA programs in the Excel software.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. An inspection method, comprising:
receiving image data from a non-contact inspection system, the image data indicative of a plurality of captured images of light projected onto a component system comprising a component;
processing the image data using a processing system to provide model data that models at least a portion of a surface of the component;
comparing the model data to nominal data for a design model for the component using the processing system to determine a subset of the model data that is closest to the nominal data;
identifying model data points in the subset of the model data based on identities of correlated nominal data points in the nominal data using the processing system to provide measurement data; and
comparing the measurement data to design data for the design model for the component using the processing system to determine deviation between the measurement data and the design data.

2. The inspection method of claim 1, further comprising:
projecting the light onto the component system using a projector, and
capturing images of the light projected onto the component system using one or more cameras to provide the image data;
wherein the non-contact inspection system comprises the projector and the one or more cameras.

3. The inspection method of claim 1, wherein
the component system further comprises a jig supporting the component;
the image data comprises jig image data associate with the jig; and
the processing of the image data comprises processing the jig image data to spatially orient the model data relative to a known coordinate system.

4. The inspection method of claim 1, further comprising:
disposing a plurality of locators on the component system;
wherein the image data comprises locator image data associate with the locators; and
wherein the processing of the image data comprises processing the locator image data to provide spatial coordinates to data points of the model data.

5. The inspection method of claim 1, wherein the nominal data points are indicative of points along loft lines of the design model for the component.

6. The inspection method of claim 5, wherein design data points in the design data correspond to the points along the loft lines of the design model for the component.

7. The inspection method of claim 1, wherein the identifying the model data points in the subset of the model data comprises naming the model data points in the subset of the model data based on names of the correlated nominal data points in the nominal data.

8. The inspection method of claim 1, further comprising processing the deviation between the measurement data and the design data to determine whether or not the component is in or out of tolerance of a design for the component.

9. The inspection method of claim 1, further comprising:
receiving second image data from the non-contact inspection system, the second image data indicative of a plurality of second captured images of light projected onto a second component system comprising a second component;
processing the second image data to provide second model data that models at least a portion of a surface of the second component;
comparing the second model data to the nominal data to determine a subset of the second model data that is closest to the nominal data;
identifying model data points in the subset of the second model data based on identities of correlated nominal data points in the nominal data to provide second measurement data;
comparing the second measurement data to the design data to determine deviation between the second measurement data and the design data; and
comparing the deviation between the measurement data and the design data and the deviation between the second measurement data and the design data.

10. The inspection method of claim 1, wherein the component comprises a component of an aircraft.

11. The inspection method of claim 1, wherein the component comprises a component of a nacelle for an aircraft propulsion system.

12. The inspection method of claim 1, wherein the non-contact inspection system is a white light non-contact inspection system.

13. An inspection method, comprising:
projecting a pattern of light onto a component system comprising a component of an aircraft using at least one projector;
capturing images of the pattern of light projected onto the component system using one or more cameras;
processing image data using a processing system to provide model data that models at least a portion of a surface of the component, the image data indicative of the captured images;
determining a subset of the model data that is closest to nominal data for a design model for the component using the processing system;
correlating information corresponding to nominal data points in the nominal data with model data points in the subset of the model data using the processing system to provide measurement data; and
determining deviation between the measurement data and design data for the design model for the component using the processing system.

14. The inspection method of claim 13, further comprising processing the deviation between the measurement data and the design data to determine whether the component is at least one of within or outside tolerance of a design for the component.

15. The inspection method of claim 13, wherein
the component system further comprises a jig supporting the component;
the image data comprises jig image data associate with the jig; and
the jig image data is used to spatially orient the model data relative to a known coordinate system.

16. The inspection method of claim 13, wherein the nominal data points are indicative of points along loft lines of the design model for the component.

17. The inspection method of claim 16, wherein design data points in the design data correspond to the points along the loft lines of the design model for the component.

18. The inspection method of claim 13, wherein
the component comprises an inlet structure of a nacelle; and
the projecting the pattern of light comprises projecting a pattern of light onto an inner radial exterior surface of the inlet structure and onto an outer radial exterior surface of the inlet structure.

19. The inspection method of claim 13, wherein
the projecting the pattern of light comprises projecting a pattern of light onto the component system at a plurality of locations about the component; and
the capturing the images comprises capturing images of the pattern of light projected onto the component system at each of the locations about the component.

* * * * *